(12) United States Patent
Sanzari

(10) Patent No.: US 9,810,594 B2
(45) Date of Patent: Nov. 7, 2017

(54) THERMALLY STABLE HIGH TEMPERATURE PRESSURE AND ACCELERATION OPTICAL INTERFEROMETRIC SENSORS

(71) Applicant: Kulite Semiconductor Products, Inc., Leonia, NJ (US)

(72) Inventor: Martin A. Sanzari, Fairlawn, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 56 days.

(21) Appl. No.: 14/989,901

(22) Filed: Jan. 7, 2016

(65) Prior Publication Data
US 2016/0202135 A1     Jul. 14, 2016

Related U.S. Application Data

(60) Provisional application No. 62/101,314, filed on Jan. 8, 2015.

(51) Int. Cl.
*G01B 9/02* (2006.01)
*G01L 9/00* (2006.01)
(Continued)

(52) U.S. Cl.
CPC ............ *G01L 19/04* (2013.01); *G01L 9/0079* (2013.01); *G01P 15/093* (2013.01)

(58) Field of Classification Search
CPC .............. G01B 9/0207; G01B 9/02071; G01B 9/02075; G01B 2290/25; G02B 6/29358;
(Continued)

(56) References Cited

U.S. PATENT DOCUMENTS 4,825,262 A    4/1989 Mallinson
5,392,117 A    2/1995 Belleville et al.
(Continued)

OTHER PUBLICATIONS

Co-pending U.S. Appl. No. 14/705,585, filed May 6, 2015, entitled "Systems and Methods for Optical Measurements Using Multiple Beam Interferometric Sensors".

*Primary Examiner* — Michael A Lyons
(74) *Attorney, Agent, or Firm* — Troutman Sanders LLP; James E. Schutz; Mark Lehi Jones

(57) ABSTRACT

Certain example implementations of the disclosed technology include an optical-interferometer sensor assembly for measuring pressure or acceleration. The sensor assembly includes a diaphragm configured to deflect responsive to an applied stimulus, a diaphragm support structure in communication with the diaphragm, a sensing optical interferometer having a first optical cavity in communication with at least a portion of the diaphragm and the diaphragm support structure, and a reference optical interferometer having a second optical cavity in communication with the diaphragm support structure. The sensor assembly can include a sensing optical fiber in communication with the sensing optical interferometer and a reference optical fiber in communication with the reference optical interferometer. The sensor assembly can include a housing in communication with the diaphragm and the diaphragm support structure, and configured to reduce a thermal expansion mismatch in the sensor assembly.

23 Claims, 12 Drawing Sheets

(51) Int. Cl.
*G01L 19/04* (2006.01)
*G01P 15/093* (2006.01)

(58) Field of Classification Search
CPC . G02B 6/29359; G01L 9/0024; G01L 9/0079; G01L 9/0044; G01L 9/0048
See application file for complete search history.

(56) References Cited

U.S. PATENT DOCUMENTS

| | | | |
|---|---|---|---|
| 5,430,574 A * | 7/1995 | Tehrani | G02B 26/001 |
| | | | 356/480 |
| 5,657,405 A * | 8/1997 | Fujiwara | G01D 5/268 |
| | | | 356/225 |
| 5,844,667 A | 12/1998 | Maron | |
| 5,907,403 A | 5/1999 | Andrews et al. | |
| 6,278,811 B1 | 8/2001 | Hay et al. | |
| 6,281,976 B1 | 8/2001 | Taylor et al. | |
| 6,422,084 B1 | 7/2002 | Fernald et al. | |
| 6,563,970 B1 | 5/2003 | Bohnert et al. | |
| 6,776,045 B2 | 8/2004 | Fernald et al. | |
| 6,925,213 B2 | 8/2005 | Boyd et al. | |
| 7,091,472 B1 | 8/2006 | Millar | |
| 7,308,162 B2 | 12/2007 | Wang | |
| 7,423,762 B2 | 9/2008 | Schmidt | |
| 7,458,273 B2 | 12/2008 | Skinner et al. | |
| 7,492,463 B2 | 2/2009 | Lopushansky et al. | |
| 7,684,656 B2 | 3/2010 | Chen | |
| 7,796,843 B2 | 9/2010 | Song et al. | |
| 8,096,704 B2 | 1/2012 | Riza et al. | |
| 8,115,937 B2 | 2/2012 | Needham | |
| 8,180,185 B2 | 5/2012 | Xia et al. | |
| 8,218,916 B2 | 7/2012 | Chen | |
| 8,264,692 B2 | 9/2012 | Hall | |
| 8,298,227 B2 | 10/2012 | Leo et al. | |
| 8,330,096 B2 | 12/2012 | Goldner et al. | |
| 8,405,822 B2 | 3/2013 | Gunther et al. | |
| 8,567,265 B2 | 10/2013 | Aeby et al. | |
| 8,764,678 B2 | 7/2014 | Bremer et al. | |
| 9,078,706 B2 | 7/2015 | Kirschman | |
| 2003/0117630 A1 * | 6/2003 | Youngner | G01L 9/002 |
| | | | 356/480 |
| 2005/0062979 A1 * | 3/2005 | Zhu | G01H 9/004 |
| | | | 356/480 |
| 2011/0170116 A1 | 7/2011 | Homa et al. | |
| 2011/0228279 A1 | 9/2011 | Lucey | |
| 2016/0273904 A1 * | 9/2016 | Sanzari | G01B 9/0207 |
| 2016/0327414 A1 * | 11/2016 | Sanzari | G01D 5/35312 |

* cited by examiner

THERMALLY STABLE HIGH TEMPERATURE PRESSURE AND ACCELERATION OPTICAL INTERFEROMETRIC SENSORS

CROSS REFERENCE TO RELATED APPLICATIONS

This application claims priority to U.S. Provisional Patent Application No. 62/101,314, filed 8 Jan. 2015, and entitled "Thermally Stable High Temperature Pressure and Acceleration Optical Interferometric Sensors," the contents of which is hereby incorporated by reference in its entirety as if presented in full.

This application is also related to U.S. Non-Provisional patent application Ser. No. 14/705,585, filed 5 May 2015, and entitled "Systems and Methods for Optical Measurements using Multiple Beam Interferometric Sensors," the contents of which is hereby incorporated by reference in its entirety as if presented in full.

TECHNICAL FIELD

This disclosure generally relates to pressure sensors and more particularly to a fiber optic pressure transducer and method for making the same

BACKGROUND

In a typical Fabry-Perot-style optical sensors, various problems can occur due to thermal expansion and contraction of sensor materials that have different coefficients of thermal expansion (CTE). The CTE mismatch can occur in regions where different materials mate, such as in the interface between the metallic supporting structures and the optical diaphragm in the interferometric cavity. In addition to the CTE mismatches, the metallic support structure, which is often made of stainless steel or similar materials having a high CTE. Mismatches in CTE can cause high thermal stress and strain between parts and cause deformation, which can result in measurement error and/or cracking of the optical glass in the extreme case. Cracking and fracturing can occur at the adhesive joints between low CTE optical glasses and high CTE metallic supporting structures. The adhesive joint, for example, can become a high strain region and can fracture due to the shear or tensile stress.

Accordingly, there is a need for improved sensors that overcome such deficiencies such that CTEs can be minimized and matched to create thermally stable structures.

BRIEF SUMMARY

Systems, methods, and apparatus are presented herein in accordance with certain example implementations of the disclosed technology for providing thermally stable optical interferometric sensors for measurement of pressure or acceleration.

According to an example implementation of the disclosed technology, a sensor assembly is provided that includes a diaphragm configured to deflect responsive to an applied stimulus, a diaphragm support structure in communication with the diaphragm, and a sensing optical interferometer having a first optical cavity in communication with at least a portion of the diaphragm and the diaphragm support structure. The sensor assembly includes a sensing optical interferometer is configured to interact with received first light to produce a measurement light signal corresponding to the applied stimulus. The sensor assembly includes a reference optical interferometer having a second optical cavity in communication with the diaphragm support structure, the reference optical interferometer is configured to interact with received second light to produce a reference light signal. The sensor assembly can include a sensing optical fiber in communication with the sensing optical interferometer, and a reference optical fiber in communication with the reference optical interferometer. The sensor assembly includes a housing in communication with the diaphragm and the diaphragm support structure, and configured to reduce a thermal expansion mismatch in the sensor assembly.

According to an example implementation of the disclosed technology, a method is provided for assembling a sensor assembly. The method includes inserting a diaphragm into a housing of an optical sensor. The diaphragm includes a central portion and an outer portion, the central portion is configured to deflect responsive to an applied stimulus. The method includes inserting a diaphragm support structure into the housing, wherein at least a portion of the diaphragm support structure is in communication with the outer portion of the diaphragm, and wherein the housing is configured to reduce a thermal expansion mismatch in the optical sensor. The method includes forming a sensing optical interferometer having a first optical cavity in communication with at least a portion of the diaphragm and the diaphragm support structure, the sensing optical interferometer is configured to interact with received first light to produce a measurement light signal corresponding to the applied stimulus. The method includes forming a reference optical interferometer having a second optical cavity in communication with the diaphragm support structure, the reference optical interferometer configured to interact with received second light to produce a reference light signal. The method further includes inserting a retaining ring into the housing, wherein at least a portion of the retaining ring is in communication with at least a portion of the diaphragm support structure, and adjusting the retaining ring to apply a preload between the diaphragm and the housing.

BRIEF DESCRIPTION OF THE FIGURES

The disclosed technology is illustrated by way of examples and certain disclosed implementations. This disclosure includes accompanying figure, in which like reference numbers indicate similar elements. Elements in the figures are illustrated for simplicity and clarity and have not necessarily been drawn to scale. The figures along with the detailed description are incorporated and form part of the specification and serve to further illustrate examples, embodiments and the like, and to explain various principles and advantages, in accordance with the present disclosure.

DETAILED DESCRIPTION

Figure 1:
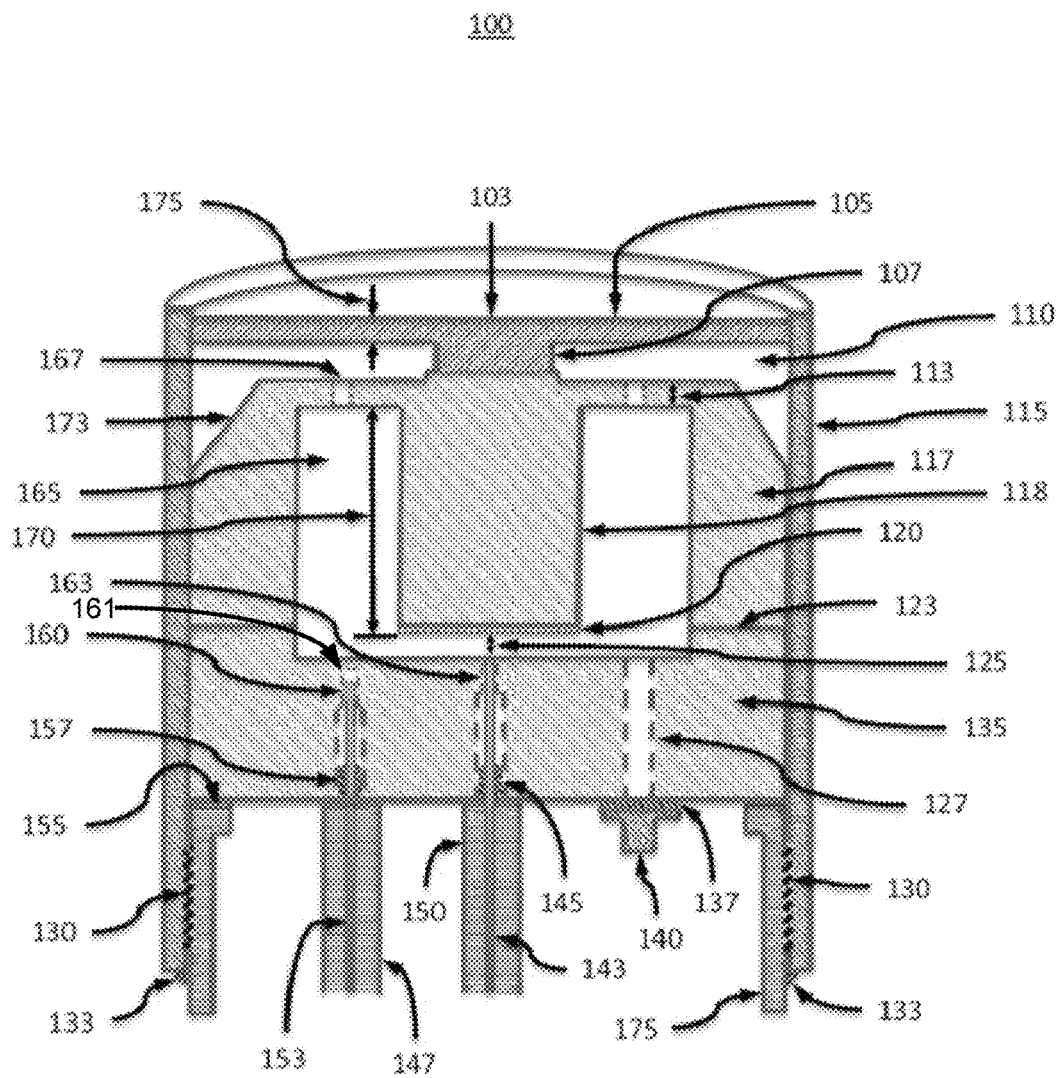
FIG. 1 is a side-view cutaway diagram of a pressure sensitive optical interferometric sensor 100, according to an example implementation of the disclosed technology.

The following detailed description is merely illustrative in nature and is not intended to limit the present disclosure, or the application and uses of the present disclosure. Furthermore, there is no intention to be bound by any expressed or implied theory presented in the preceding field of use, background, or summary of the disclosure or the following detailed description. The disclosed technology includes various examples, embodiments and the like, which may be described herein in terms of functional or logical block elements.

Various techniques described herein may be used for a fluid-filled pressure sensor assembly capable of higher pressure environments. The various aspects described herein are presented as methods, devices (or apparatus), and systems that may include a number of components, elements, members, modules, nodes, peripherals, or the like. Further, these methods, devices, and systems may or may not include additional components, elements, members, modules, nodes, peripherals, or the like without departing from the scope of the disclosed technology.

Throughout the specification and the claims, the following terms take at least the meanings explicitly associated herein, unless the context clearly dictates otherwise. The terms "connect," "connecting," and "connected" mean that one function, feature, structure, or characteristic is directly joined to or in communication with another function, feature, structure, or characteristic. The terms "couple," "coupling," and "coupled" mean that one function, feature, structure, or characteristic is directly or indirectly joined to or in communication with another function, feature, structure, or characteristic. Relational terms such as "first" and "second," and the like may be used solely to distinguish one entity or action from another entity or action without necessarily requiring or implying any actual such relationship or order between such entities or actions. The term "or" is intended to mean an inclusive or. Further, the terms "a," "an," and "the" are intended to mean one or more unless specified otherwise or clear from the context to be directed to a singular form. The term "include" and its various forms are intended to mean including but not limited to. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%.

In the following description, numerous specific details are set forth. But, it is to be understood that embodiments of the disclosed technology may be practiced without these specific details. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may.

Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure.

FIG. 1 depicts a cross-sectional cutaway view of a pressure sensitive optical interferometric sensor 100, according to an example implementation of the disclosed technology. Certain features and configurations of the disclosed technology may enable the sensor 100 to be thermally stable. For example, as will be discussed below, certain features and configurations of the disclosed technology may help reduce and/or minimize various problems that can occur due to different sensor components having different coefficients of thermal expansion (CTE).

In accordance with an example implementation of the disclosed technology, the CTE of the optical glass and the metallic supporting structure associated with the sensor 100 may be minimized and matched through a specific temperature range to create a thermally stable structure with minimum stress and strain between the optical interferometric sensing surfaces and the supporting structure. As will be appreciated, this may help minimize and/or eliminate false pressure readings resulting from stress deformation.

In one example implementation, a pressure sensor 100 may include an optical glass diaphragm 117 made of a low CTE glass such as Zerodur™ manufactured by Schott or ULE™ manufactured by Corning. Zerodur™ has a CTE of $0.05 \times 10^{-6}/°$ C., which is close to zero in the temperature range of $-55°$ C.$-150°$ C. and ULE has a CTE of $0.03 \times 10^{-6}/°$ C. in the temperature range of $-55°$ C.$-150°$ C. Certain example implementations may utilize similar low-CTE materials without departing from the scope of the disclosed technology.

In one embodiment, the diaphragm 117 may be circular with a surrounding void region or cavity 165 that may define the central portion 118 as well as a flexible portion of the diaphragm. In one example implementation, the void region or cavity 165 may be formed by removing material from the diaphragm 117. In certain example implementations, the void region or cavity 165 may form a flexible region 113 of the diaphragm 117, for example, so that the central portion 118 of the diaphragm 117 may flex with the application of applied pressure 103 in communication with the diaphragm 117. For example, according to an example implementation of the disclosed technology, an enclosure diaphragm 105 may transfer the applied pressure 103 to the (glass) diaphragm 117. In one example implementation, the enclosure diaphragm 105 may be made from metal. In certain example implementations, the enclosure diaphragm 105 can include a protrusion 107 for intimate contact with the (glass) diaphragm 117.

According to one embodiment, the depth 170 of the first cavity or void region 165 surrounding the central portion 118 of the diaphragm 117 may be configured such that it is a minimum of approximately six times the thickness 113 of the flexible region of the diaphragm 117. As may be appreciated by one having ordinary skill in the art, this dimensional ratio may help maximize the linearity between the applied pressure 103 and the deflection of the diaphragm 117. In one example implementation, the top perimeter of the diaphragm 117 may include a chamfer 173 to reduce stress during bending and to eliminate corner contact with the case 115. In one embodiment, the diaphragm 117 can be joined to the diaphragm support structure 135. For example, in one embodiment, the diaphragm 117 can be joined 123 to the diaphragm support structure 135 by optical contacting. In another example implementation, the diaphragm 117 can be joined 123 to the diaphragm support structure 135 by hydroxide bonding. These two bonding techniques will be explained below.

As will be appreciated, in addition to being dimensionally stable, any bonding techniques used to adhere or join optical components must be able to withstand harsh thermal and vibrational conditions while maintaining their dimensional stability. Two such bonding techniques are optical contacting and hydroxide-catalysis bonding. Optical contacting is the adhesion of polished surfaces without the use of any external bonding materials. Highly polished surfaces with very little surface figure mismatch, when brought into contact, form a bond through Van der Waals forces. If the surfaces have the same index of refraction, then the interface between the two surfaces can effectively disappear. One of the main disadvantages to optical contacting is that once bonds are formed, it can be very difficult to adjust the position of optical components. Generally, this can be overcome by adding a drop of an alcohol-based cleaning solution at the interface between the two bonding surfaces. A weak bond forms, and gradually strengthens as the solution evaporates. During this period of time, adjustment of the optical components is possible. The other technique, known as hydroxide bonding, may provide versatility when adhering optical components of differing materials while providing superior bond strength. Accordingly, hydroxide bonding may be utilized, according to an example implementation of the disclosed technology, to bond glass pieces to various types of materials, ranging from silicon carbide (SiC), to Super Invar, to other glass materials.

For a bond to form using the hydroxide bonding technique, the OH— ions present in the solution act to etch the surfaces of the materials, resulting in a release of silicate ions, which decreases the pH value. Once the pH falls below a value of approximately 11, the silicate ions may dissociate and reform into siloxane chains. As the water dehydrates, the siloxane chains may bond together to form the resulting bond at the interface. Hydroxide bonding may be utilized for bonding glass to materials such as SiC, Super Invar, or even silver-plated piezoelectrics, according to an example implementation of the disclosed technology.

In accordance with an example implementation of the disclosed technology, the hydroxide bonding process may include choosing the hydroxide, the hydroxide concentration, and how much of the solution to use. In certain example implementations, such control of these parameters may allow tailoring the bond to form for different materials. In accordance with an example implementation of the disclosed technology, these parameters can be varied to produce a bond of varying strength.

Again with reference to FIG. 1, and as previously discussed, the top of the diaphragm 117 can be connected to an interface on the circular metal enclosure diaphragm 105, for example, on the protrusion 107. In one embodiment, the applied pressure 103 may deflect the metal enclosure diaphragm 105, which in turn deflects the central portion 118 of the diaphragm 117.

According to an example embodiment, the deflection of the central portion 118 changes the distance of the interferometric gap 125, which in turn, alters a fringe pattern when interrogated with light from an optical fiber 143. In accordance with an example implementation of the disclosed technology, the metal enclosure diaphragm 105 and the cylindrical case 115 can be manufactured from Super Invar, and may be welded together. The CTE of Super Invar is $0.6 \times 10^{-6}/°$ C. in the temperature range $-55°$ C.-$150°$ C. The deflection resulting from an applied pressure 103 of the combined metal enclosure diaphragm 105 and the diaphragm 117 is a function of the stiffness of the diaphragm material, stiffness of the Super Invar, respective thickness 175 of the metal enclosure diaphragm, thickness of the diaphragm flexible region 113, the diameter of the metal enclosure diaphragm 105 and the width of the flexible region of the diaphragm (as will be shown and discussed below with reference to FIG. 2).

In one embodiment, a vacuum pump can be attached to the vacuum tube 140 so that the internal cavity of the void region 165 and the external cavity 110 volumes can be evacuated, (for example, via the evacuation bore 127 in the support structure) to form a vacuum in both of these regions. In one example implementation, the vacuum tube 140 may be made from stainless steel. Accordingly, in one embodiment, the atmospheric gas can be evacuated through the evacuation holes 167. In one example implementation, the vacuum tube 140 can be attached to the diaphragm support structure 135 at an external end of the evacuation bore 127 using an indium ring compression seal 137 for applications below the 156° C. melting point of indium. Alternatively, high-temperature ceramic adhesives can be utilized for higher temperature applications. In one embodiment, the compression seal 137 may be vacuum tight and may act to bridge the differences in the thermal coefficient of expansions between the diaphragm support structure 135 and the stainless steel vacuum tube 140 without breaking the vacuum seal. In one example implementation, when a vacuum is achieved using the vacuum pump, the vacuum tube 140 is crimped shut, thus forming a permanent seal.

In one embodiment, a pressure sensing optical fiber 143 can be bonded to the diaphragm support structure 135 at or near least at a first entrance location 145 and/or a first exit location 163 of a first fiber bore in the diaphragm support structure 135. Similarly, the temperature/reference signal optical fiber 153 can be bonded to the diaphragm support structure 135 at least at a second entrance location 157 and/or at a bonding location 160 of a second fiber (partial) bore in the diaphragm support structure 135. In accordance with an example implementation of the disclosed technology, any or all of the bonds between the optical fibers 143 153 and the diaphragm support structure 135 can be created by a number of means including, but not limited to, direct bonding, anodic bonding, laser fusion bonding, glass solders, and ceramic adhesives. Further, in some embodiments, the pressure sensing optical fiber 143 and the temperature/reference optical fiber 153 can be encased in cladding material. For example, outside of the diaphragm support structure 135, the optical fibers 143 153 can be encased in respective protective jacketing 150 147. The jacketed fibers can have lengths of several meters to a kilometer where the fiber is attached to, and read by, the optical measurement system for multiple beam interferometric sensors. Such optical measurement system is described in U.S. Non-Provisional patent application Ser. No. 14/705,585, filed 5 May 2015, and entitled "Systems and Methods for Optical Measurements using Multiple Beam Interferometric Sensors," the contents of which is hereby incorporated by reference in its entirety as if presented in full.

In an example implementation, the temperature/reference fiber 153 may be bonded to the diaphragm support structure 135 within a bore that extends at least partially through the diaphragm support structure 135, such that a reference interferometric cavity 161 is established between the end of the temperature/reference fiber 153 and the inner portion of the bore. In another example implementation, the reference interferometric cavity 161 may be established on the end of the temperature/reference fiber 153, by deposition of a thin film for example, prior to insertion of the reference fiber 153 in to the diaphragm support structure 135. In certain example implementations the reference interferometric cavity 161 effective optical length may be set to a linear portion of the fringe pattern, and may approximately match the corresponding (anticipated) sensing interferometric gap 125, such as between approximately 5 and approximately 15 microns for example, so that the sensing interferometric gap 125 may be fine adjusted via the retaining ring 175 and thread interface 130 to provide a temperature reference signal that can be subtracted from the sensing signal, as will be further explained below.

In accordance with an example implementation of the disclosed technology, since temperature affects both the pressure sensing optical fiber 143 and the temperature/reference optical fiber 153, the sensor reading from the temperature/reference fiber 153 may be subtracted from the sensor reading from the pressure fiber 143. As will be appreciated, this can at least partially remove the effects of temperature from the pressure sensor to give a true pressure reading of the applied pressure 103. In one embodiment, the light exiting surface of the pressure sensing optical fiber 143 can be coplanar to the inner surface of the diaphragm support structure 135 at the interferometric gap 125. This configuration enables the surfaces to be polished to form a true coplanar surface. With the fiber embedded in the diaphragm support structure 135, it is protected if an over-pressure condition occurs at the applied pressure 103. During an over-pressure condition, the glass diaphragm 118 can deflect to a point where it would hit and damage the pressure sensing optical fiber 143 if it extended past the inner surface of the diaphragm support structure 135 near the first exit location 163. In accordance with an example implementation of the disclosed technology, the pressure sensing optical fiber 143 is embedded in the diaphragm support structure 135 to provide protection from being damaged during an over-pressure condition.

In accordance with an example implementation of the disclosed technology, the interferometric gap 125 between the bottom of the central portion 118 of the diaphragm 117 and the exit plane of the pressure sensing optical fiber 143 may be set to between approximately 5 and approximately 15 microns. In accordance with an example implementation of the disclosed technology, this gap 125 can be adjusted so that the optical interference fringe intensity (resulting from interrogating the Fabry-Perot type mirrored cavity) varies linearly with applied pressure. In certain example implementations, the fringe intensity and visibility can be enhanced by adding an optical thin film filter 120 (for example, a silicon dioxide thin film) to the diaphragm 118.

In one example embodiment, the optical fibers 143 153 may be bonded within fiber bores in the diaphragm support structure. For example, the optical fibers 143 153 may be bonded at the first entrance location 145 and the second entrance location 157, respectively. In certain example implementations, the optical fibers 143 153 may have the surrounding removable cladding, buffering, and protective jacket stripped off over end portions for bonding the glass optical fiber core to the diaphragm support structure 135. Accordingly, in one embodiment, the sensor can be assembled by placing the diaphragm 118 and the diaphragm supporting structure 135 into the cylindrical case 115, which may be supported by a retaining ring 175. In certain example implementations, the cylindrical case 115 and retaining ring 175 materials may be Super Invar.

In an example implementation, the cylindrical case 115 may include threads, for example, on an inside portion of the cylindrical case 115, and the retaining ring 175 may include corresponding mating threads on an outside portion of the retaining ring 175. In certain example implementations, the retaining ring 175 can be threaded into the cylindrical case 115 so that the respective threads join the retaining ring 175 and cylindrical case 115 at a thread interface 130. In certain example implementations, threading the retaining ring 175 into the cylindrical case 115 may press on the diaphragm support structure at a retention interface 155 to apply a preload between the diaphragm 118 and the cover enclosure diaphragm 105 at the interface protrusion 107. As may be appreciated by those having ordinary skill in the art, such preloading may allow for adjusting the interferometric gap 125 of the Fabry-Perot interferometer. In accordance with an example implementation of the disclosed technology, the interferometric gap 125 distance can be adjusted to find the proper gap by connecting the pressure sensing optical fiber 143 to an optical interrogator or optical spectrometer and adjusting the interferometric gap 125 so that the linear portion of the interference signal is being read by the detection system. Upon completion of the adjustment and calibration, in one embodiment, the retaining ring 175 can be welded 133 (or otherwise secured) to the cylindrical case 115.

Figure 2:
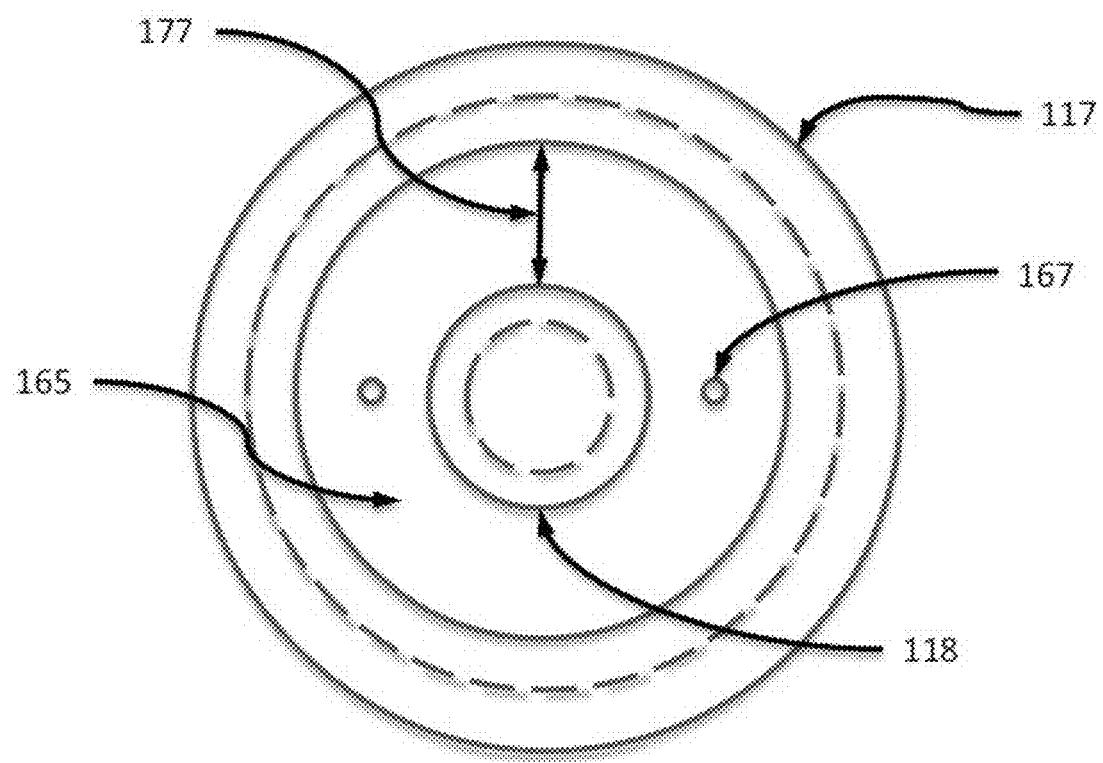
FIG. 2 is an end-view cross sectional depiction of a diaphragm 117 and associated optical sensor structure, according to an example implementation of the disclosed technology.

FIG. 2 is an end-view cross sectional depiction of a circular diaphragm 117 (corresponding to the diaphragm 117 in FIG. 1) according to an example implementation of the disclosed technology. The circular diaphragm 117 may be defined, in part, by a surrounding void region 165 (as also discussed above with respect to FIG. 1). In certain example implementations, the void region 165 may be defined by a void width 177, which can be described as a difference between an inner and outer radius relative to the center of the central portion 118 of the diaphragm 117. FIG. 2 also depicts an end view of the evacuation holes 167 (as shown and discussed above with reference to FIG. 1), for example, to evacuate the void region 165. Certain example implementations may include other shapes and configurations of the diaphragm, etc., without departing from the scope of the disclosed technology.

Figure 3:
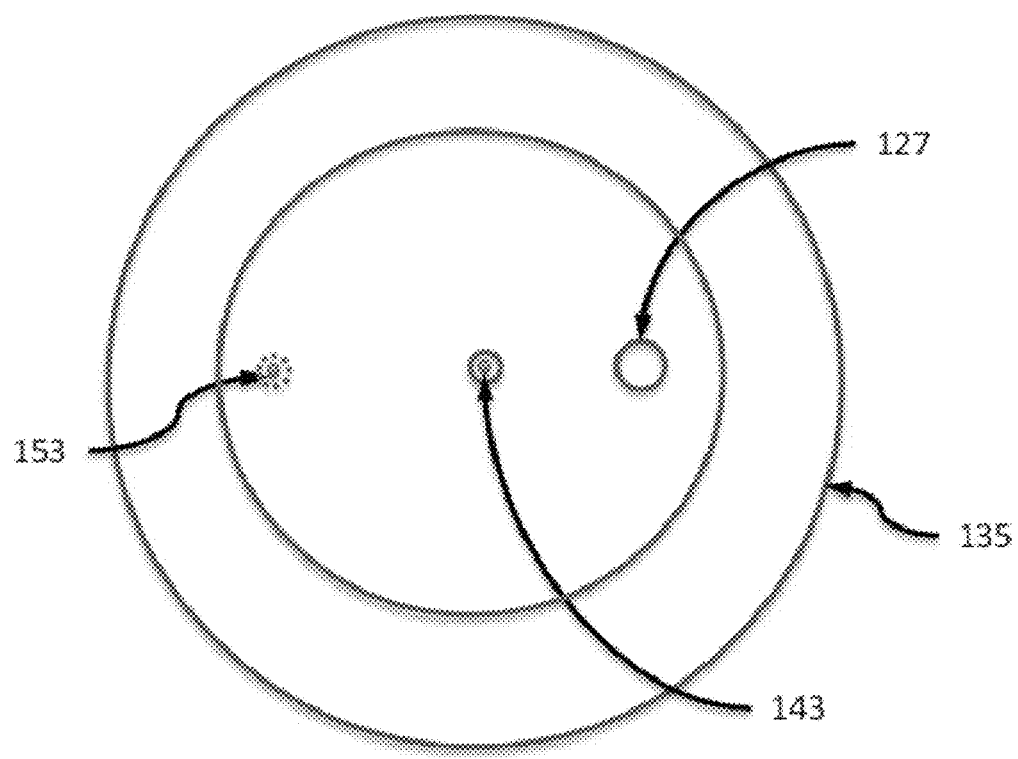
FIG. 3 is an end-view cross sectional depiction of a diaphragm support structure 135, according to an example implementation of the disclosed technology.

FIG. 3 is an end-view depiction of a diaphragm support structure 135, (as shown also in FIG. 1) according to an example implementation of the disclosed technology. In one embodiment, a pressure sensing optical fiber 143 can be bonded to a fiber bore that extends through the diaphragm support structure 135 as previously discussed (and as shown in FIG. 1). In an example implementation, the temperature/reference signal optical fiber 153 can be bonded to the diaphragm support structure 135. In an example implementation, the end of the temperature/reference signal optical fiber 153 may be recessed below the surface of the diaphragm support structure 135, for example, within a reference fiber bore that partially extends through the diaphragm support structure 135, as previously discussed. FIG. 3 also shows the end view of the evacuation bore 127, as discussed with respect to FIG. 1.

Figure 4:
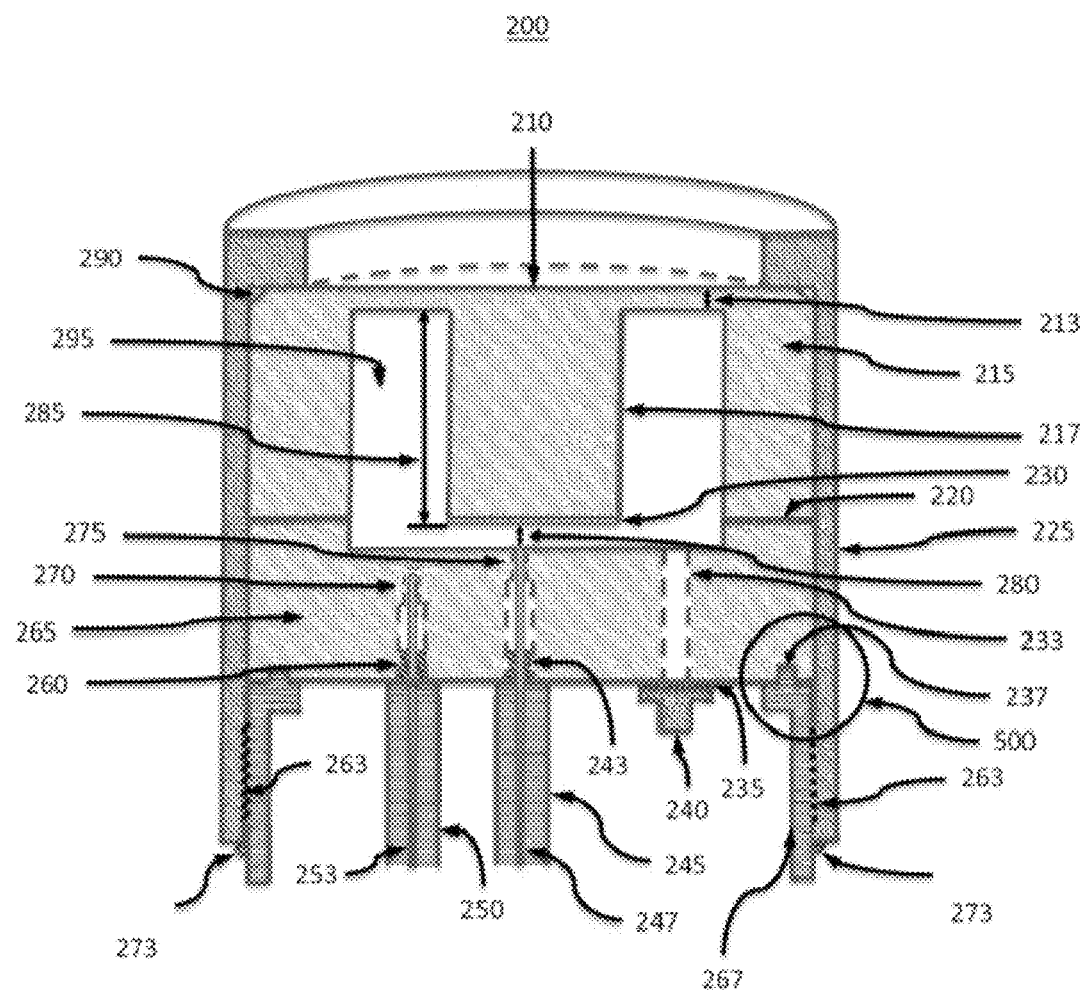
FIG. 4 is a side-view cutaway diagram of a pressure sensitive optical interferometric sensor 200, according to another example implementation of the disclosed technology.

FIG. 4 is a side-view cutaway diagram of a pressure sensitive optical interferometric sensor 200, according to another example implementation of the disclosed technology. In this example implementation, the sensor 200 may be configured for high temperature operation with an operating temperature range of −55° C. to 600° C., according to one embodiment. As may be understood by one having skill in the art, operation at high temperature typically requires thermally stable materials and design configurations that minimize the stresses that can develop as a result of the differences in CTE over the large temperature range. CTEs can be matched over limited temperature ranges but variations of CTEs as a function of temperature (i.e., CTE(T)) can be significantly different for most dissimilar materials such as glass and metals. Large differences in the CTE(T) between materials can cause anomalous pressure measurements resulting from strain, catastrophe failure, or stress cracking at the joints.

In one embodiment, the high-temperature sensor 200 may comprise a glass diaphragm 215. In certain example implementations, the glass diaphragm 215 may be made of fused silica, Zerodur, Zerodur K20 or ULE, depending on the maximum temperature required. The maximum continuous working temperatures for the preceding glasses are 1,000° C., 600° C., 850° C. and 800° C., respectively. Fused Silica may be used for maximum temperatures of 600° C. since the CTE of fused silica more closely matches the CTE of optical fiber. In an example implementation, the metal case 225 may be made of Invar 36, which has a low CTE from −55° C.-100° C., according to one embodiment. It is noted that Invar 36 has an increasing CTE above 100° C., but Invar 36's CTE is still lower than most metals. As will be appreciated, Invar 36 typically is used for higher temperature applications as opposed to, for example, Super Invar.

Typically, the CTE difference over the temperature range causes a separation at the joint 237 between the retaining ring 267 and the diaphragm support structure 265 (as indicated by the circled region 500). In one embodiment, the joint 237 may be designed for use with ceramic adhesives, with working temperatures of 1700° C., applied to the square notch of the joint 237. In one embodiment, the square notch of the joint 237 may provide increased surface area for bonding, thereby increasing the strength of the bond at the joint. Further, in one embodiment, the metal case 225 can have an open end so that the applied pressure 210 is in direct contact with the diaphragm 215. Accordingly, in response to the applied pressure 210, the diaphragm 215 deforms, and the interferometric gap 280 varies as a function of applied pressure 210. Generally, maximum linearity between the applied pressure 210 and the deflection can be achieved by setting the length 285 of the central portion 217 of the diaphragm 215 to be at least six times as long as the thickness 213 of the flexible portion of the diaphragm 215. In one embodiment, the diaphragm 215 has a chamfer 290 top perimeter to eliminate cracking in the corner contact area with the metal case 225. Further, in one embodiment, the bottom of the central portion of the diaphragm 215 can be coated with an optical thin film of silicon dioxide 230 to maximize the sensitivity of the Fabry-Perot cavity 280. According to one embodiment, the diaphragm 215 can be joined by optical contact or hydroxide bonding at an interface 220 between the diaphragm 215 and the diaphragm support structure 265, as previously described.

Figure 5:
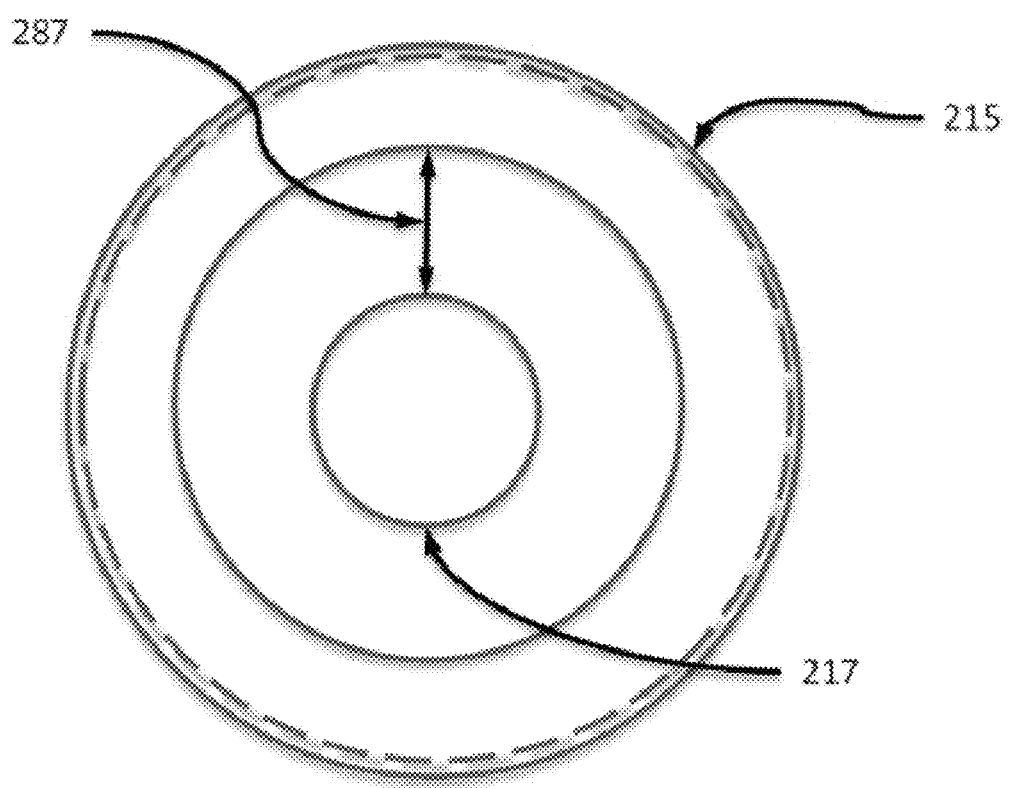
FIG. 5 is an end-view cross sectional depiction of a diaphragm 215, according to an example implementation of the disclosed technology.

FIG. 5 is an end-view cross sectional depiction of a diaphragm 215, according to an example implementation of the disclosed technology, which includes a central portion 217 surrounded by a flexible region (corresponding to the internal cavity 295 of FIG. 4, which is similar to the void region 165 as shown in FIG. 1 and FIG. 2). This flexible region may be defined by a width 287, which can be described as a difference between an inner and outer radius relative to the center of the central portion 217 of the diaphragm 215. Certain example implementations may include other shapes and configurations of the diaphragm, etc., without departing from the scope of the disclosed technology.

As may be understood by those having skill in the art, the deflection resulting from an applied pressure 210 to the central portion 217 of the diaphragm 215 is a function of the stiffness of the diaphragm material, the thickness 213 of the flexible portion of the diaphragm 215, and the width 287 of the flexible portion of the diaphragm 217.

Returning now to to FIG. 4, and in accordance with an example embodiment, a vacuum pump may be attached to the vacuum tube 240 so that the internal cavity 295 is evacuated to form a vacuum in this region. In one embodiment, the atmospheric gas can be evacuated through an evacuation bore 233. In an example implementation, the vacuum tube 240 can be attached to the diaphragm support structure 265 using high temperature ceramic adhesives at the interface 235 of the vacuum tube 240 and the diaphragm support structure 265. Typically, the seal is vacuum tight and acts to bridge the differences in the thermal coefficient of expansions between the diaphragm support structure 265 and the vacuum tube 240 without breaking the vacuum seal. In certain example implementations, the vacuum tube 240 may comprise stainless steel.

In certain example implementations, after a vacuum is achieved using the vacuum pump, the vacuum tube 240 may be crimped shut to form a permanent seal. Subsequently, in one embodiment, the pressure-sensing optical fiber 247 can be bonded to the diaphragm support structure 265 at one or more corresponding bonding locations 243 275 (as discussed with reference to FIG. 1). Similarly, the temperature/reference signal optical fiber 253 can be bonded to the diaphragm support structure 265 at one or more corresponding locations 260, 270 (as also discussed with reference to FIG. 1). In accordance with an example implementation of the disclosed technology, the bonds can be created by a number of means including, but not limited to, direct bonding, anodic bonding, laser fusion bonding, glass solders, and ceramic adhesives. In one embodiment, the pressure sensing optical fiber 247 and the temperature/reference optical fiber 253 can be encased in cladding material.

Newly available single mode optical fibers have core diameters up to 125 microns, which is many times larger than the typical 8-10 micron diameter core. This enlarged core enables more light to enter the system, and the sensor produces a more intense measurement signal that is returned to the optical measurement system. The increased intensity of the measurement signal enhances the signal-to-noise ratio and increases optical fringe visibility. In one embodiment, the optical fibers 247 253 can be encased in respective high temperature gold protective jacketing 245 250, for example, below the diaphragm support structure 265, which in certain embodiments, can protect the optical fibers 247 253 up to temperatures of approximately 700° C. The jacketed optical fibers 247 253 can have lengths of several meters to a kilometer were the fiber is attached to, and read by, the optical measurement system for multiple beam interferometric sensors. Such optical measurement system is described in U.S. Non-Provisional patent application Ser. No. 14/705,585, filed 5 May 2015, and entitled "Systems and Methods for Optical Measurements using Multiple Beam Interferometric Sensors," the contents of which is hereby incorporated by reference in its entirety as if presented in full.

As previously discussed, since temperature affects both optical fibers 247 253, in one embodiment, the sensor reading from the temperature/reference fiber 253 is subtracted from the sensor reading from the pressure fiber 247. As will be appreciated, this removes the effects of temperature from the pressure sensor to give a true pressure reading of the applied pressure 210.

In one embodiment, the light-exiting surface of the pressure sensing optical fiber 247 can be coplanar to the inner surface of the diaphragm support structure 265 at the interferometric gap 280. Such a configuration enables the surfaces to be polished to form a true coplanar surface. With the fiber embedded in the diaphragm support structure 265, the fiber is protected if an over-pressure condition occurs at the applied pressure 210. As will be understood, during an over-pressure condition, the glass diaphragm 217 can deflect to a point where it may hit and damage the optical fiber 247 if the optical fiber 247 extended past the inner surface of the diaphragm support structure 265. Accordingly, in one embodiment, the optical fiber 247 may be embedded in the diaphragm support structure, at or below the surface, to protect it from being damaged during such an over-pressure condition. In one embodiment, the gap 280 between the bottom of the diaphragm and the exit plane of the optical fiber may be configured to between approximately five and approximately fifteen microns. This gap 280 can be adjusted so that the optical interference fringe intensity (detected at the measurement system) resulting from the Fabry-Perot-type mirrored cavity varies linearly with applied pressure.

In one embodiment, the optical fibers 247 253 may be bonded into the diaphragm support structure 265 at the corresponding bonding regions 243 and 260. For example, the optical fibers 247 253 may have the surrounding removable cladding, buffering, and protective jacket stripped off over end portions for bonding the glass optical fiber core to the diaphragm support structure 265. According to one embodiment, the sensor 200 can be assembled by bonding the diaphragm 215 to the diaphragm support structure 265 using optical contacting or hydroxide bonding at the interface 220. In an example implementation, this assembly may be placed into the Invar 36 cylindrical case 225, which is supported by an Invar 36 retaining ring 267, according to one embodiment. The cylindrical case 225 can include case threads 273. The retaining ring 267 may include corresponding retaining ring threads 263 to enable threading the retaining ring 267 to the case 225. In certain example implementations, high-temperature ceramic adhesive can be applied to the notch of the joint 237, and the retaining ring 267 can be threaded into the Invar 36 case 225, according to one embodiment. As will be appreciated, the adhesive creates a seal to prohibit any gas from escaping through the structure. Upon completion of adjustments and calibration, the retaining ring can be welded 273 to the case 225.

Figure 9:
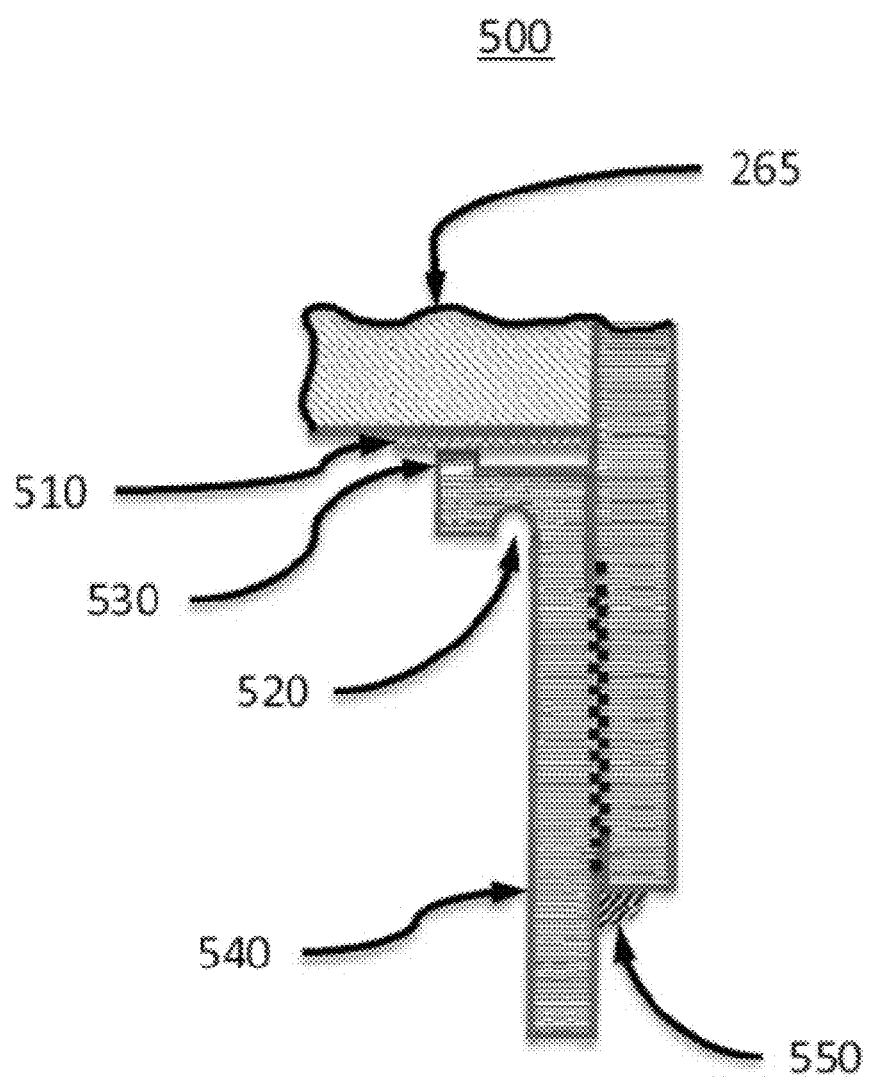
FIG. 9 is a detailed cross-sectional side view depiction retaining ring design 500, according to an example implementation of the disclosed technology.

FIG. 9 shows a cross-sectional side view depiction of an alternative retaining ring design 500 (corresponding to the retaining ring 267 and the joint 237 shown in FIG. 4). In this design 500, an adhesive may not be required. According to an example implementation of the disclosed technology, a circular gasket 510 made of mica, for example, can be placed against the bottom of the diaphragm support structure 265. In one example implementation, the Invar 36 retaining ring 540 can then be machined to form a flexure 520 and a notch 530 at the top of the retaining ring 540. As may be appreciated by one having skill in the art, when the retaining ring 540 is screwed into place against the mica gasket 510, the flexure 520 will bend and apply constant pressure to the mica gasket 510. Accordingly, in one embodiment, the notch 530 can press against the mica gasket 510 to form a seal. In accordance with an example implementation of the disclosed technology, a preload applied to the flexure 520 may keep the notch 530 and gasket 510 interface in compression when the diaphragm and Invar 36 casing start to expand as the temperature rises. In accordance with an example implementation of the disclosed technology, upon applying the preload (for example, by threading), the retaining ring 540 may be is welded 550 in place to secure it to the case.

Invar 36 has the unique property that the modulus of elasticity increases as a function of temperature to a maximum and then begins to decrease as the temperature continues to increase. This initial positive slope is opposite to the behavior exhibited by other metals. Generally, as metals are heated, the modulus of elasticity decreases continuously with temperature. This unique property of Invar 36 results from the same magneto-constriction effects that cause its unusually low coefficient of thermal expansion. Since this is a magnetic effect, the slope becomes negative after passing through the Curie temperature of the material. The shape of the curve representing the modulus of elasticity as a function of temperature can be approximated by the following fourth order parabolic function:

$$E(T) = (2.07326 \times 10^{-11} T^4 - 4.10939 \times 10^{-8} T^3 + 1.78008 \times 10^{-5} T^2 - 0.003156847 T + 21.2655157) \times 10^6 \text{ psi},$$

where E(T) is the modulus of elasticity as function of temperature T, measured in degrees Fahrenheit. Invar 36 has the same modulus of elasticity at 33° C. and 554° C. Accordingly, the stress in the flexure compression created by the preload is minimally affected by changes in the modulus of elasticity as a function of temperature and is primarily affected by the difference in thermal expansion and dimensional differences (for example, between the diaphragm 215 and diaphragm support structure 265 and the Invar 36 casing 225 of FIG. 4). In one embodiment, the preload required is the amount needed to cause the flexure 520 to bend a greater amount than the difference caused by the unbalanced thermal expansion. In certain example embodiments configured for temperatures approaching 1000° C., sapphire has a higher melting point and could be used for the diaphragm and diaphragm support structure (such as the diaphragm 215 and diaphragm support structure 265 as shown in FIG. 4). In certain example implementations, Inconel may be used for the metal casing and retaining ring (such as the metal casing 225 and retaining ring 267 as shown in FIG. 4, or the retaining ring 540 as shown in FIG. 9).

FIG. 5 is an end-view cross sectional depiction of a diaphragm 215, according to an example implementation of the disclosed technology.

Figure 6:
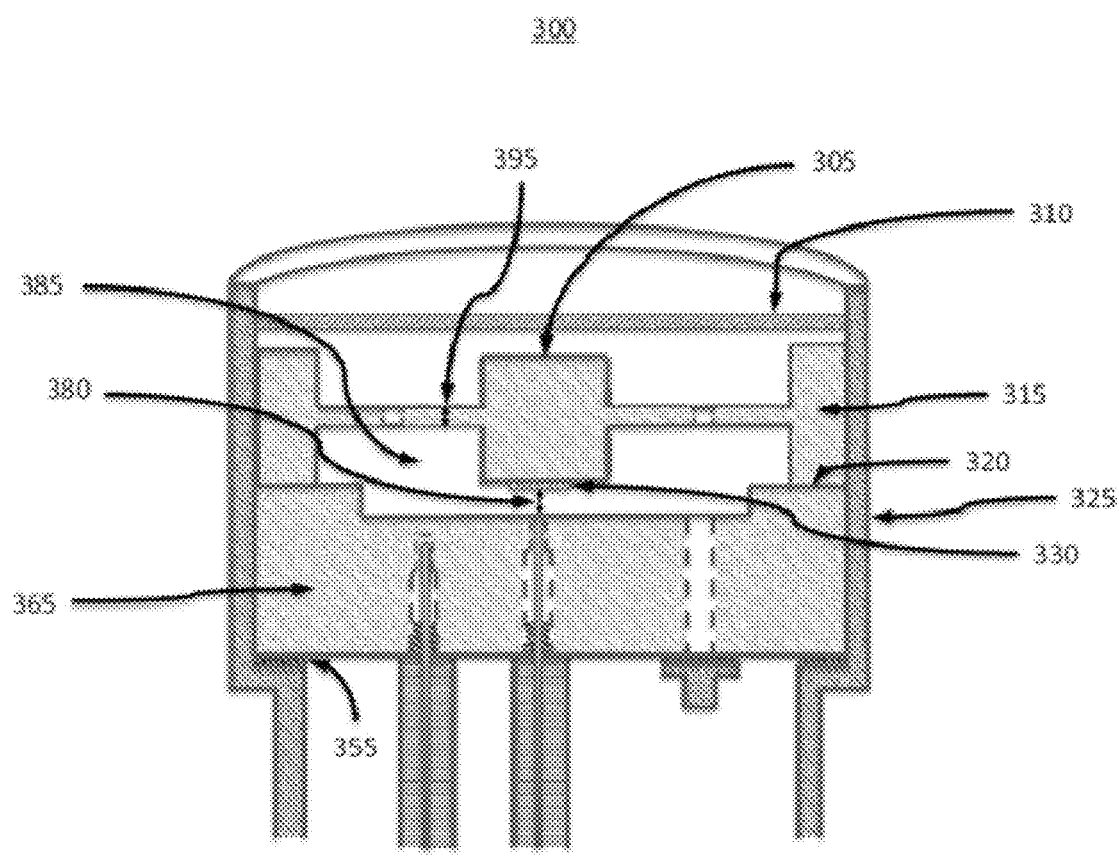
FIG. 6 is a side-view cutaway diagram of an accelerometer 300, according to another example implementation of the disclosed technology.

FIG. 6 is a side-view cutaway diagram of an accelerometer 300, according to another example implementation of the disclosed technology. According to certain embodiments, the accelerometer 300 may include a supporting structure 365 and a diaphragm 315. In one example implementation, the supporting structure 365 can be made from ceramic. In one example implementation, the diaphragm 315 can be made from ceramic. Other materials may be utilized without departing from the scope of the disclosed technology. According to an example implementation of the disclosed technology, the supporting structure 365 and a diaphragm 315 can be optically contacted or hydroxide bonded at the interface 320, in a similar fashion as previously discussed.

Figure 7:
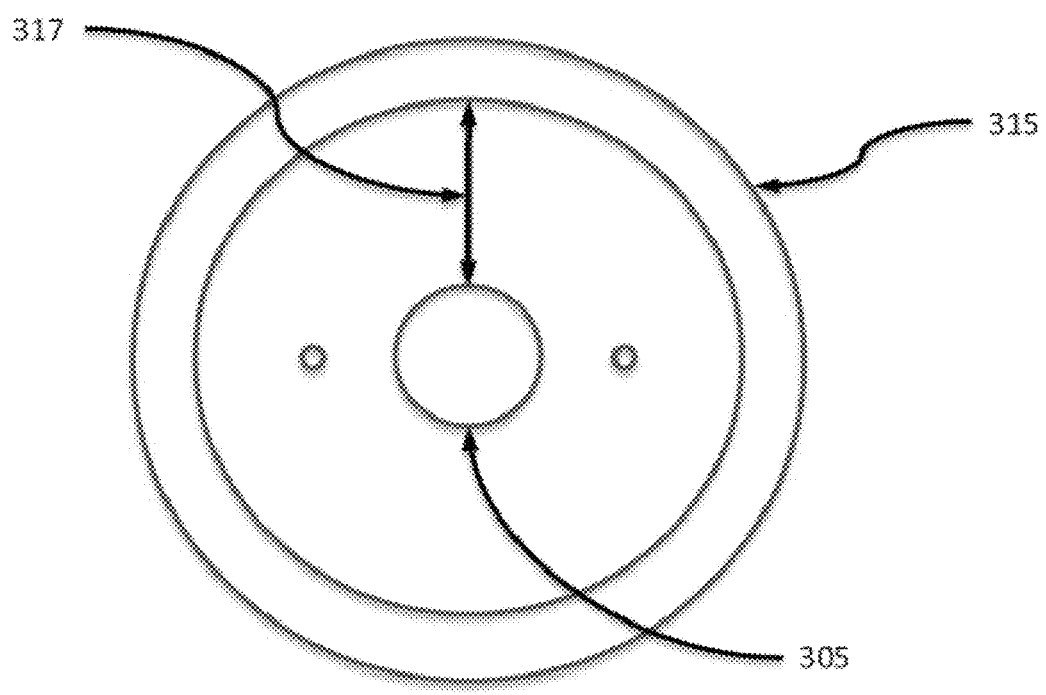
FIG. 7 is an end-view cross sectional depiction of a diaphragm 315, according to an example implementation of the disclosed technology.

FIG. 7 is an end-view cross sectional depiction of the diaphragm 315, according to an example implementation of the disclosed technology. In one embodiment, the diaphragm 315 may have material removed from one or more of the top and bottom portions to form a flexible ring portion having a width 317 around the central portion, which may act as a proof mass 305 for the accelerometer 300.

Returning again to FIG. 6, removing the material from one or more of the top and bottom portions of the diaphragm 315 (to form a flexible ring portion) may also form a cavity 385 below and/or above portions of the diaphragm 315. Such a configuration may produce larger central portion, which can act as the proof mass 305 for the acceleration sensor 300. Further, in one example embodiment, the proof mass 305 of the diaphragm can move freely, for example by removing any protrusion that might contact the cover 310 (for example, the protrusion 107 as shown in FIG. 1 can be removed from the cover 310 to enable free movement of the proof mass 305). In accordance with an example implementation of the disclosed technology, the resonant frequency of the diaphragm 315 and associated structure can be controlled by the various dimensions such as the width 317 and thickness 395 of the flexible portion, the size of the proof mass 305, and the material properties of the diaphragm 315 that make up the equivalent spring constant of the structure.

In one embodiment, the bottom of the proof mass 305 can be flat and may include an optical coating 330. The interferometer gap 380 can be adjusted during assembly to maximize fringe visibility and signal output linearity, according to certain example embodiments, and as previously discussed. The sensor 300 can be assembled by placing the diaphragm 315 and the diaphragm supporting structure 365 into the Invar 36 cylindrical case 325 where it can be bonded to the case 325 with high temperature ceramic adhesive 355. In one embodiment, the cover 310 can be welded to the case 325. In certain example implementations, the same materials can be used for the design shown in FIG. 6 as are described in relation to sensors as discussed with respect to FIG. 1 and FIG. 4. In general, the remaining structure features and assembly can be similar to sensors 100 200 as previously discussed.

Figure 8:
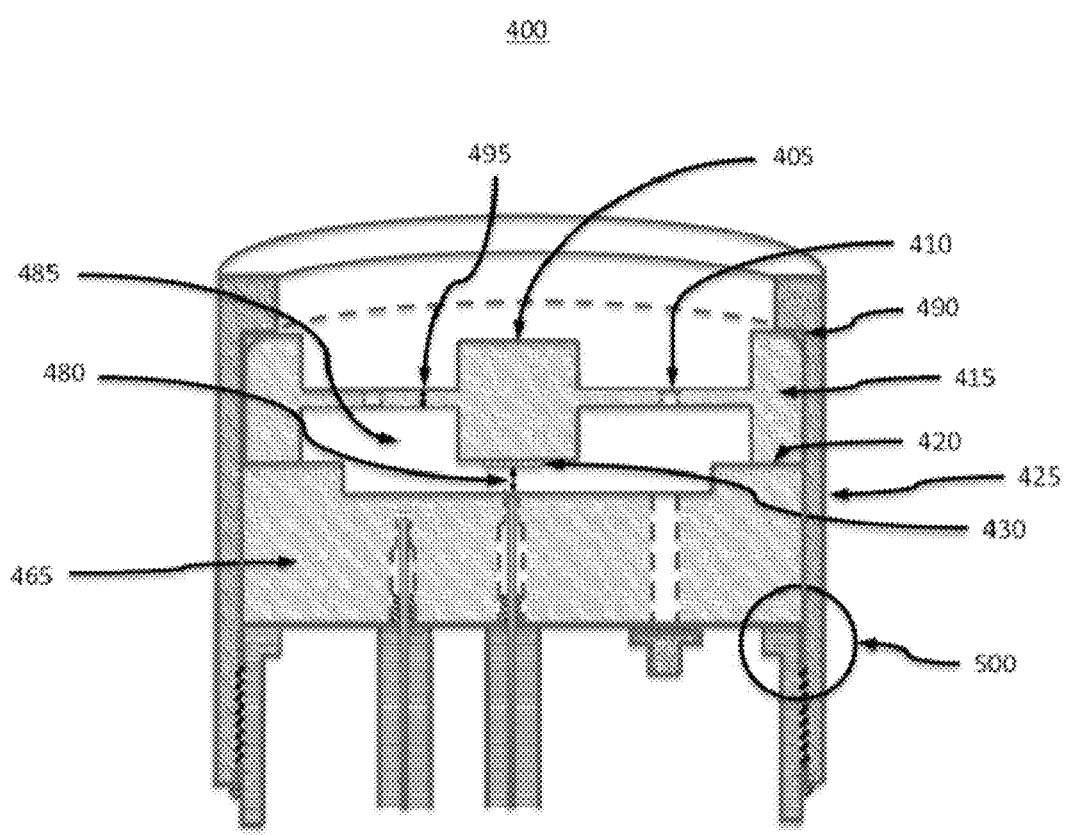
FIG. 8 is a side-view cutaway diagram of another optical interferometric-based accelerometer sensor 400, according to another example implementation of the disclosed technology.

FIG. 8 is a side-view cutaway diagram of another optical interferometric-based accelerometer sensor 400, according to another example implementation of the disclosed technology, in which the cover (such as the cover 310 as discussed with respect to FIG. 6) is removed. In one embodiment, the diaphragm 415 is held into place by the overlapping edge of the Invar 36 casing 425. In certain example implementations, the diaphragm 415 can include a chamfer 490 around the outer top perimeter to eliminate corner chipping of the ceramic diaphragm. In one embodiment, the diaphragm 415 may contain a centrally located proof mass 405. Further, the diaphragm 415 may be bonded to the diaphragm support structure 465 by optical contact or hydroxide bonding at the interface 420. The resonant frequency of the structure can be controlled by the various dimensions and materials, as previously discussed. For example, the resonant frequency of the structure can be influenced by the width (such as the width 317 as shown in FIG. 7) and thickness 495 of the flexible portion of the diaphragm 415, the size of the proof mass 405, and the material properties of the diaphragm 415 that make up the equivalent spring constant of the structure.

In one embodiment, the bottom of the proof mass 405 is flat and optically coated 430. Further, the interferometer gap 480 can be adjusted during assembly to maximize fringe visibility and signal output linearity. In certain example implementations, the internal cavity 485 can be exposed to atmospheric pressure. The sensor can also be operated with the internal cavity 485 at vacuum pressures. Under these conditions, the holes 410 can be omitted, according to one embodiment. In general, the remaining structure features and assembly may be the same of similar to the structures and features previously described with reference to at least FIG. 1 and FIG. 4.

Figure 10:
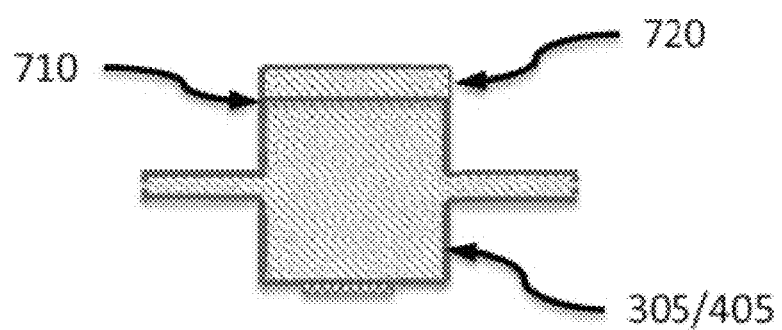
FIG. 10 depicts a first embodiment 700A and a second embodiment 700B of proofing mass and additional mass, according to an example implementation of the disclosed technology.
Figure 10:
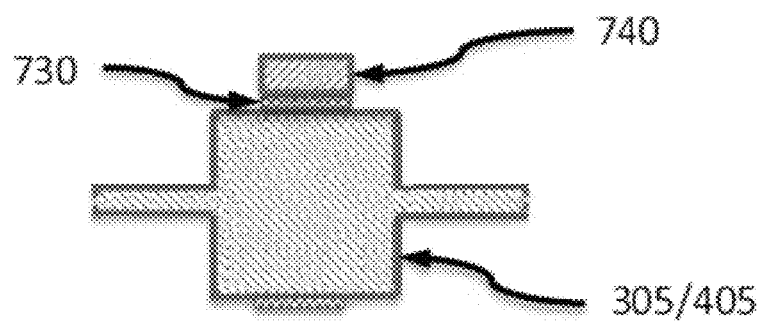

FIG. 10 depicts a first example embodiment 700A and a second example embodiment 700B of proofing mass 305/405 and corresponding additional mass 720/740 that can be added to the corresponding proofing mass 305/405, according to an example implementation of the disclosed technology. (The proofing mass 305 is shown in FIG. 6 and the proofing mass 405 is shown in FIG. 8). In accordance with an example implementation of the disclosed technology, the resonant frequency of the previously discussed accelerometer designs 300 400 can be adjusted by adding additional mass 720/740 to the proof mass 305 405, according to one embodiment.

In the first example embodiment 700A, an additional mass 720 may be added to the proof mass 305/405 of either design 300 400 previously discussed. The additional mass 720, which in one embodiment can include optical glass, can be bonded to the proof mass 305/405 using optical contacting or hydroxide bonding at the intervening interface 710, according to an example implementation of the disclosed technology.

In the second example embodiment 700B, an additional mass 740 may be added to the proof mass 305/405 of either design 300 400 previously discussed. In certain example implementations, the additional mass 740 can be made of one of the metals; Super Invar, Invar 36, or Inconel. The additional mass 740 can be bonded to the proof mass 305/405 using high temperature ceramic adhesive or hydroxide bonding at the intervening interface 730.

Figure 11:
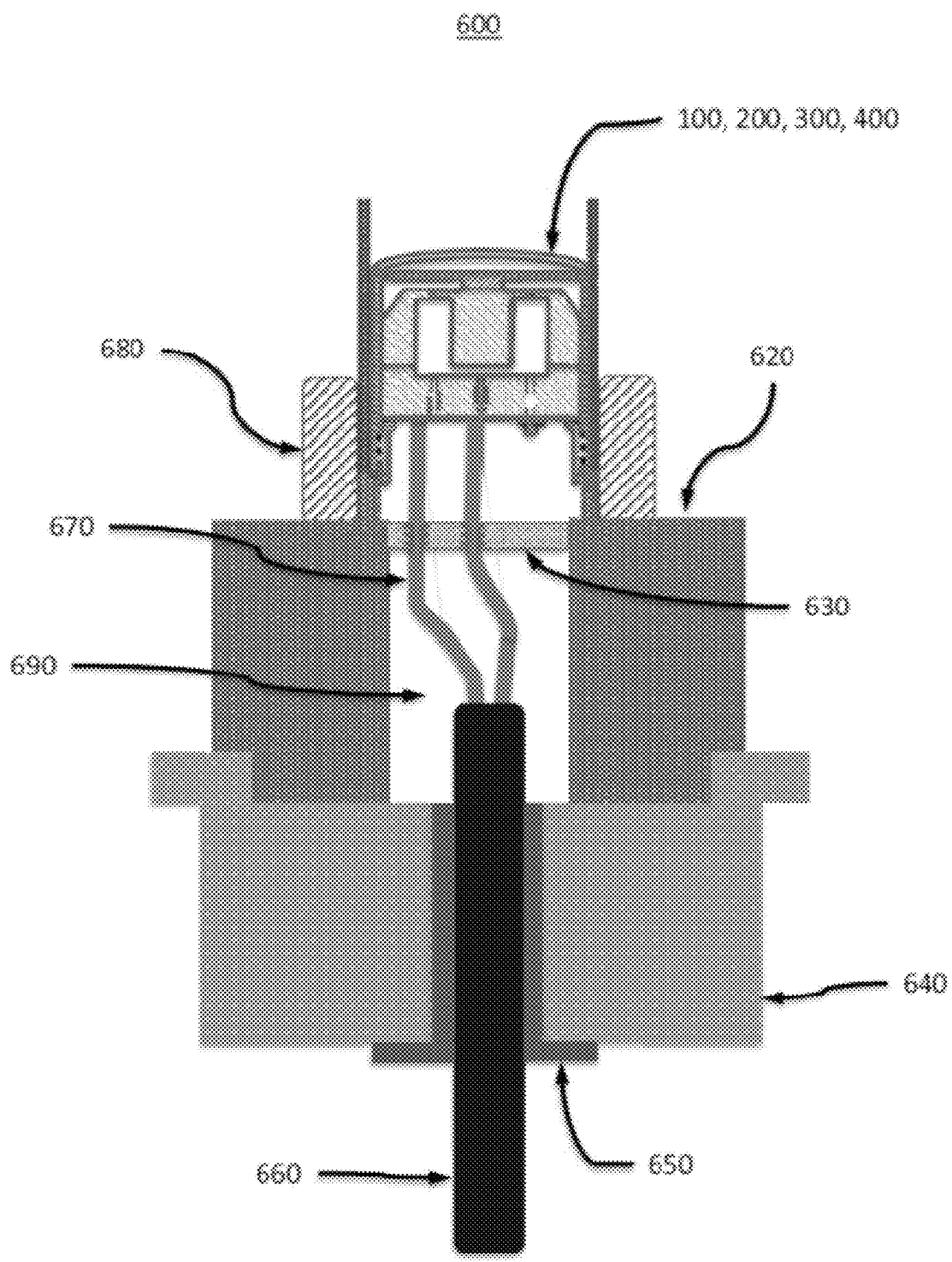
FIG. 11 is a side-view cutaway diagram of an optical interferometric sensor assembly 600, according to an example implementation of the disclosed technology.

FIG. 11 is a side-view cutaway diagram of an optical interferometric sensor assembly 600, according to an example implementation of the disclosed technology. In accordance with an example implementation of the disclosed technology, some or all of the previously discussed sensors 100 200 300 400 and associated housings may be mountable in the threaded metal casing 620. In accordance with certain example implementations of the disclosed technology, the casing 620 can be made of Super Invar, Invar 36, or Inconel, for example, to match the housing material of the specific sensor 100 200 300 400. In certain example implementations, a sensor housing, for example can be mounted into a screw housing 620, according to one embodiment. Further, in one embodiment, the screw housing 620 can be threaded for pressure port 680 mounting or for secure mounting to measure acceleration. In one embodiment, the strain relief and support 630 may be configured to hold the optical fibers 670, which may include cladding and/or a protective coating.

In accordance with an example implementation of the disclosed technology, extended diameter single mode optical fibers may be utilized. Such fibers have core diameters that are approximately 125 microns in diameter, which is much larger than the typical 5-8 micron diameter single mode fiber cores. These larger diameter fibers may allow for enhanced signal-to-noise ratios and greater fringe visibility. For high temperature applications, the fibers may be configured to include protective coating (such as a gold protective coating), according to certain example embodiments.

During assembly, the sensor housings can be mounted to the screw housing 620 in a vacuum level pressure, according to one embodiment, as this may help to ensure that the cavity 690 is in vacuum. In one embodiment, the optical fiber cable relief housing 640 can be connected to the screw housing 620. In certain example implementations, the optical fibers 670 can be encased in the furcation tubing 660, which passes through the crimp ring 650 attached to the cable relief housing 640, according to one embodiment. For harsh environments, an additional stainless steel braid can be placed between the fiber coating and the furcation tubing 660. Additionally, in some embodiments, the fiber cable can extend from 1 meter to 1 kilometer to an optical measurement system. Such optical measurement system is described in U.S. Non-Provisional patent application Ser. No. 14/705,585, filed 5 May 2015, and entitled "Systems and Methods for Optical Measurements using Multiple Beam Interferometric Sensors," the contents of which is hereby incorporated by reference in its entirety as if presented in full.

According to an example implementation of the disclosed technology, a sensor assembly is provided that may include a diaphragm configured to deflect responsive to an applied stimulus, a diaphragm support structure in communication with the diaphragm, and a sensing optical interferometer having a first optical cavity in communication with at least a portion of the diaphragm and the diaphragm support structure. The sensor assembly may include a sensing optical interferometer is configured to interact with received first light to produce a measurement light signal corresponding to the applied stimulus. The sensor assembly may include a reference optical interferometer having a second optical cavity. In certain example implementations, the second optical cavity may be in communication with the diaphragm support structure. In certain example implementations, the reference optical interferometer may be configured to interact with received second light to produce a reference light signal. The sensor assembly can include a sensing optical fiber in communication with the sensing optical interferometer, and a reference optical fiber in communication with the reference optical interferometer. The sensor assembly may include a housing in communication with the diaphragm and the diaphragm support structure, and configured to reduce a thermal expansion mismatch in the sensor assembly.

According to an example implementation of the disclosed technology, the sensing optical fiber may be configured to provide a first interrogation light to the sensing optical interferometer. In certain example implementations, the sensing optical fiber may be configured to output the measurement light signal having a fringe pattern corresponding to the applied stimulus.

In certain example implementations, the reference optical fiber may be configured to provide a second interrogation light to the reference optical interferometer. In certain example implementations, the reference optical fiber may be configured to output reference light signal having a fringe pattern corresponding to a temperature associated with at least a portion of the sensor assembly.

In certain example implementations, the reference light signal may be utilized to produce a temperature-compensated signal by subtracting a first signal associated with the reference light signal from a second signal associated with the measurement light signal.

In one example implementation, the sensor diaphragm can include a central deflection region. In an example implementation, the sensor diaphragm may be in communication with an enclosure diaphragm in at least a central portion of the sensor diaphragm, wherein the enclosure diaphragm is configured to communicate the applied stimulus to at least the central portion of the sensor diaphragm. In certain example implementations, the enclosure diaphragm can include a protrusion in mechanical communication with at least a portion of the sensor diaphragm.

In certain example implementations, the sensor diaphragm can include an oxide layer in communication with the first optical cavity, wherein the oxide layer is configured to enhance a reflectivity associated with at least a portion of the sensor diaphragm that is in communication with the first optical cavity.

In an example implementation, the sensing optical interferometer is positioned in a first region having a first temperature, and the sensing optical interferometer is adapted to measure the applied stimulus, and wherein the reference optical interferometer is positioned in a second region having a temperature substantially equal to the first temperature, the reference optical interferometer is isolated from the applied stimulus.

According to an example implementation of the disclosed technology, the applied stimulus comprises one or more of pressure and acceleration.

In certain example implementations, sensor assembly can include a sealable evacuation bore extending through the diaphragm support structure, the sealable evacuation bore in communication with a least a portion of the first optical cavity. In certain example implementations, the sealable evacuation bore may be in communication with a second cavity portion of the sensor assembly, wherein the second cavity portion is in communication with the sensor diaphragm but external to the first optical cavity.

Certain example implementations of the sensor assembly can include a threaded retention ring in communication with the housing and the diaphragm support structure, the threaded retention ring may be configured for one or more of retaining at least the diaphragm support structure and preloading the diaphragm. Certain example implementations may include a mica gasket disposed between the retention ring and the diaphragm support structure.

According to an example implementation of the disclosed technology, the sensor assembly may include a casing that includes a threaded screw housing configured for mounting the sensor assembly to a measurement port. In an example implementation, the casing may include one or more strain reliefs configured for securing one or more of the sensing and reference optical fibers.

In an example implementation, the diaphragm of the sensor assembly can include a flexible region having a thickness in communication with a central portion having a depth, wherein the depth of the central portion is configured to be a minimum of about six times the thickness of the flexible region.

In certain example implementations, the diaphragm may be bonded to the diaphragm support structure by hydroxide bonding. In certain example implementations, the diaphragm may be bonded to the diaphragm support structure by optical contacting.

According to an example implementation of the disclosed technology, the sensing optical fiber may be at least partially recessed in the diaphragm support structure to provide protection from being damaged during an over-pressure condition.

In accordance with an example implementation of the disclosed technology, the housing may comprise Super Invar. In certain example implementations, the housing may comprise Invar 36.

Figure 12:
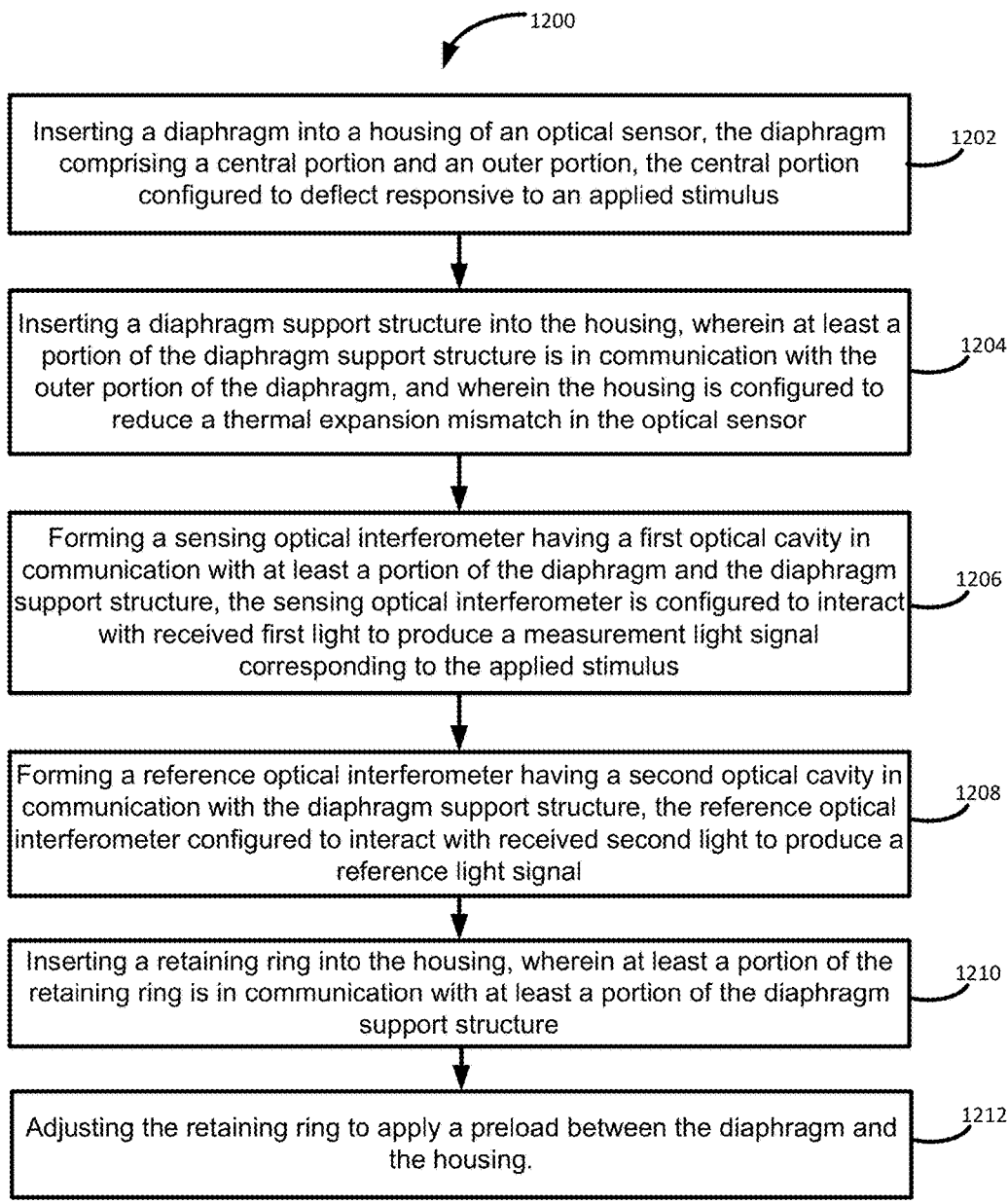
FIG. 12 is a flow diagram of a method 1200, in accordance with an example implementation of the disclosed technology.

FIG. 12 is a flow diagram of a method 1200, in accordance with an example implementation of the disclosed technology. In block 1202, the method 1200 includes inserting a diaphragm into a housing of an optical sensor, the diaphragm comprising a central portion and an outer portion, the central portion configured to deflect responsive to an applied stimulus. In block 1204, the method 1200 includes inserting a diaphragm support structure into the housing, wherein at least a portion of the diaphragm support structure is in communication with the outer portion of the diaphragm, and wherein the housing is configured to reduce a thermal expansion mismatch in the optical sensor. In block 1206, the method 1200 includes forming a sensing optical interferometer having a first optical cavity in communication with at least a portion of the diaphragm and the diaphragm support structure, the sensing optical interferometer is configured to interact with received first light to produce a measurement light signal corresponding to the applied stimulus. In block 1208, the method 1200 includes forming a reference optical interferometer having a second optical cavity in communication with the diaphragm support structure, the reference optical interferometer configured to interact with received second light to produce a reference light signal. In block 1210, the method 1200 includes inserting a retaining ring into the housing, wherein at least a portion of the retaining ring is in communication with at least a portion of the diaphragm support structure. In block 1214, the method 1200 includes adjusting the retaining ring to apply a preload between the diaphragm and the housing.

In accordance with an example implementation of the disclosed technology, applying the preload may adjust an interferometric gap in the optical cavity of the sensing optical interferometer.

In certain example implementations, the method can further include inserting a gasket between the retaining ring and the diaphragm support structure.

According to an example implementation of the disclosed technology, the method can further include machining the retaining ring to form one or more of a flexure and a notch in the retaining ring.

It is important to recognize that it is impractical to describe every conceivable combination of components or methodologies for purposes of describing the claimed subject matter. However, a person having ordinary skill in the art will recognize that many further combinations and permutations of the subject technology are possible. Accordingly, the claimed subject matter is intended to cover all such alterations, modifications, and variations that are within the spirit and scope of the claimed subject matter.

Although the present disclosure describes specific examples, embodiments, and the like, various modifications and changes may be made without departing from the scope of the present disclosure as set forth in the claims below. For example, although the example methods, devices and systems, described herein are in conjunction with a configuration for the aforementioned single and grouped pressure valve, the skilled artisan will readily recognize that the example methods, devices or systems may be used in other methods, devices or systems and may be configured to correspond to such other example methods, devices or systems as needed. Further, while at least one example, embodiment, or the like has been presented in the foregoing detailed description, many variations exist. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all of the claims. Any benefits, advantages, or solutions to problems that are described herein with regard to specific examples, embodiments, or the like are not intended to be construed as a critical, required, or essential feature or element of any or all of the claims.

The invention claimed is:

1. A sensor assembly, comprising:
a diaphragm configured to deflect responsive to an applied stimulus;
a sensing optical interferometer having a first optical cavity in communication with at least a portion of the diaphragm, the sensing optical interferometer is configured to interact with received first light to produce a measurement light signal corresponding to the applied stimulus;
a reference optical interferometer having a second optical cavity in communication with a cavity that extends partially through a diaphragm support structure, the reference optical interferometer is configured to interact with received second light to produce a reference light signal; and
a housing in communication with the diaphragm and the diaphragm support structure, and configured to reduce a thermal expansion mismatch in the sensor assembly.

2. The sensor assembly of claim 1, further comprising a sensing optical fiber in communication with the sensing optical interferometer, wherein the sensing optical fiber is configured to provide a first interrogation light to the sensing optical interferometer, and wherein the sensing optical fiber is further configured to output the measurement light signal having a fringe pattern corresponding to the applied stimulus.

3. The sensor assembly of claim 1, further comprising a reference optical fiber in communication with the reference optical interferometer wherein the reference optical fiber is configured to provide a second interrogation light to the reference optical interferometer, and wherein the reference optical fiber is further configured to output reference light signal having a fringe pattern corresponding to a temperature associated with at least a portion of the sensor assembly.

4. The sensor assembly of claim 1, wherein the reference light signal is utilized to produce a temperature-compensated signal by subtracting a first signal associated with the reference light signal from a second signal associated with the measurement light signal.

5. The sensor assembly of claim 1, wherein the sensor diaphragm comprises a central deflection region, and wherein the sensor diaphragm is in communication with an enclosure diaphragm in at least a central portion of the sensor diaphragm, wherein the enclosure diaphragm is configured to communicate the applied stimulus to at least the central portion of the sensor diaphragm.

6. The sensor assembly of claim 5, wherein the enclosure diaphragm comprises a protrusion in mechanical communication with at least a portion of the sensor diaphragm.

7. The sensor assembly of claim 1, wherein the sensor diaphragm comprises an oxide layer in communication with the first optical cavity, wherein the oxide layer is configured to enhance a reflectivity associated with at least a portion of the sensor diaphragm that is in communication with the first optical cavity.

8. The sensor assembly of claim 1, wherein the sensing optical interferometer is positioned in a first region having a first temperature, the sensing optical interferometer is adapted to measure the applied stimulus, and wherein the reference optical interferometer is positioned in a second region having a temperature substantially equal to the first temperature, wherein the reference optical interferometer is isolated from the applied stimulus.

9. The sensor assembly of claim 1, wherein the applied stimulus comprises one or more of pressure and acceleration.

10. The sensor assembly of claim 1, further comprising a sealable evacuation bore extending through the diaphragm support structure, the sealable evacuation bore in communication with a least a portion of the first optical cavity.

11. The sensor assembly of claim 10, wherein the sealable evacuation bore is further in communication with a second cavity portion of the sensor assembly, wherein the second cavity portion is in communication with the sensor diaphragm but external to the first optical cavity.

12. The sensor assembly of claim 1, further comprising a threaded retention ring in communication with the housing and the diaphragm support structure, the threaded retention ring configured for one or more of retaining at least the diaphragm support structure and preloading the diaphragm.

13. The sensor assembly of claim 12, further comprising a mica gasket disposed between the retention ring and the diaphragm support structure.

14. The sensor assembly of claim 1, further comprising a casing, the casing comprising:
a threaded screw housing configured for mounting the sensor assembly to a measurement port; and
one or more strain reliefs configured for securing one or more of the sensing and reference optical fibers.

15. The sensor assembly of claim 1, wherein the diaphragm comprises a flexible region having a thickness in communication with a central portion having a depth, wherein the depth of the central portion is configured to be a minimum of about six times the thickness of the flexible region.

16. The sensor assembly of claim 1, wherein the diaphragm is bonded to the diaphragm support structure by hydroxide bonding.

17. The sensor assembly of claim 1, wherein the diaphragm is bonded to the diaphragm support structure by optical contacting.

18. The sensor assembly of claim 1, wherein the sensing optical fiber is recessed in the diaphragm support structure to provide protection from being damaged during an overpressure condition.

19. The sensor assembly of claim 1, wherein the housing comprises one or more of Super Invar and Invar 36.

20. A method comprising:
inserting a diaphragm into a housing of an optical sensor, the diaphragm comprising a central portion and an outer portion, the central portion configured to deflect responsive to an applied stimulus;
inserting a diaphragm support structure into the housing, wherein at least a portion of the diaphragm support structure is in communication with the outer portion of the diaphragm, and wherein the housing is configured to reduce a thermal expansion mismatch in the optical sensor;
forming a sensing optical interferometer having a first optical cavity in communication with at least a portion of the diaphragm and the diaphragm support structure, wherein the sensing optical interferometer is configured to interact with received first light to produce a measurement light signal corresponding to the applied stimulus;
forming a reference optical interferometer having a second optical cavity in communication with a cavity that extends partially through the diaphragm support structure, wherein the reference optical interferometer is configured to interact with received second light to produce a reference light signal;
inserting a retaining ring into the housing, wherein at least a portion of the retaining ring is in communication with at least a portion of the diaphragm support structure; and
adjusting the retaining ring to apply a preload between the diaphragm and the housing.

21. The method of claim 20, further comprising inserting a gasket between the retaining ring and the diaphragm support structure.

22. The method of claim 20, further comprising machining the retaining ring to form one or more of a flexure and a notch in the retaining ring.

23. The method of claim 20, wherein applying the preload adjusts an interferometric gap in the optical cavity of the sensing optical interferometer.

* * * * *